US012072760B2

(12) United States Patent
Cunningham et al.

(10) Patent No.: US 12,072,760 B2
(45) Date of Patent: Aug. 27, 2024

(54) METHODS AND APPARATUS TO CONTROL EXECUTION OF TASKS IN A COMPUTING SYSTEM

(71) Applicant: Intel Corporation, Santa Clara, CA (US)

(72) Inventors: Andrew Cunningham, Ennis (IE); Patrick Fleming, Laois (IE); Naveen Lakkakula, Chandler, AZ (US); Richard Guerin, Scottsdale, AR (US); Charitra Sankar, Chandler, AZ (US); Stephen Doyle, Ennis (IE); Ralph Castro, Chandler, AZ (US); John Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 17/133,305

(22) Filed: Dec. 23, 2020

(65) Prior Publication Data

US 2021/0117191 A1    Apr. 22, 2021

(51) Int. Cl.
| | |
|---|---|
| *G06F 11/00* | (2006.01) |
| *G06F 9/30* | (2018.01) |
| *G06F 9/448* | (2018.01) |
| *G06F 9/48* | (2006.01) |
| *G06F 11/10* | (2006.01) |

(52) U.S. Cl.
CPC ........ *G06F 11/1004* (2013.01); *G06F 9/3005* (2013.01); *G06F 9/4494* (2018.02); *G06F 9/4881* (2013.01)

(58) Field of Classification Search
CPC .................................................. G06F 11/1004
See application file for complete search history.

(56) References Cited

U.S. PATENT DOCUMENTS

| | | | |
|---|---|---|---|
| 9,158,617 B2* | 10/2015 | Cho .................... | H03M 13/09 |
| 11,500,748 B1* | 11/2022 | Ofir .................... | G06F 11/0772 |
| 2008/0022136 A1* | 1/2008 | Mattsson ............ | H04L 67/1006 |
| | | | 713/194 |
| 2009/0327818 A1* | 12/2009 | Kogelnik ............. | G06F 21/602 |
| | | | 714/49 |

(Continued)

OTHER PUBLICATIONS

Wikapedia, "Block cipher mode of operation," retrieved from https://en.wikipedia.org/w/index.php?title=Block_cipher_mode_of_operation&oldid=1009981392 Mar. 3, 2021 (21 pages).

(Continued)

*Primary Examiner* — Michael Maskulinski
(74) *Attorney, Agent, or Firm* — Hanley, Flight & Zimmerman, LLC

(57) ABSTRACT

Methods, apparatus, systems and articles of manufacture are disclosed to control execution of tasks in a computing system. The methods, apparatus, systems and articles of manufacture include at least one storage device and at least one processor to, execute instructions to at least obtain a request to perform an inverse operation on a data flow, the data flow previously transformed during a forward operation, determine a first processor core that executed the forward operation, the data flow including an identifier of the first processor core, and transmit the data flow to a second processor core to perform the inverse operation.

25 Claims, 7 Drawing Sheets

(56) References Cited

U.S. PATENT DOCUMENTS

| | | | |
|---|---|---|---|
| 2013/0339322 A1* | 12/2013 | Amit .................. | H03M 7/6023 |
| | | | 707/693 |
| 2014/0059378 A1* | 2/2014 | Ishii ................... | G06F 11/1464 |
| | | | 714/15 |
| 2018/0217889 A1* | 8/2018 | Bhutta ................ | G06F 11/0751 |

OTHER PUBLICATIONS

Intel, "Intel® QuickAssist Technology (Intel® QAT)," retrieved from https://www.intel.com/content/www/us/en/architecture-and-technology/intel-quick-assist-technology-overview.html accessed on Mar. 22, 2021, (8 pages).

Wikapedia, "Triple modular redundancy," https://en.wikipedia.org/wiki/Triple_modular_redundancy Jan. 29, 2021 (5 pages).

Wikapedia, "Dual modular redundancy," https://en.wikipedia.org/wiki/Dual_modular_redundancy Dec. 3, 2020 (2 pages).

* cited by examiner

METHODS AND APPARATUS TO CONTROL EXECUTION OF TASKS IN A COMPUTING SYSTEM

FIELD OF THE DISCLOSURE

This disclosure relates generally to a computing system, and, more particularly, to control execution of tasks in a computing system.

BACKGROUND

In recent years, computing systems have been designed to include more than one processor. Such computing systems are referred to as multi-core computing systems. Multi-core computing systems can perform a plurality of tasks in parallel, increase efficiency of the computing system, optimize the computing system, and provide different opportunities for troubleshooting.

BRIEF DESCRIPTION OF THE DRAWINGS

The figures are not to scale. In general, the same reference numbers will be used throughout the drawing(s) and accompanying written description to refer to the same or like parts.

Figure 1:
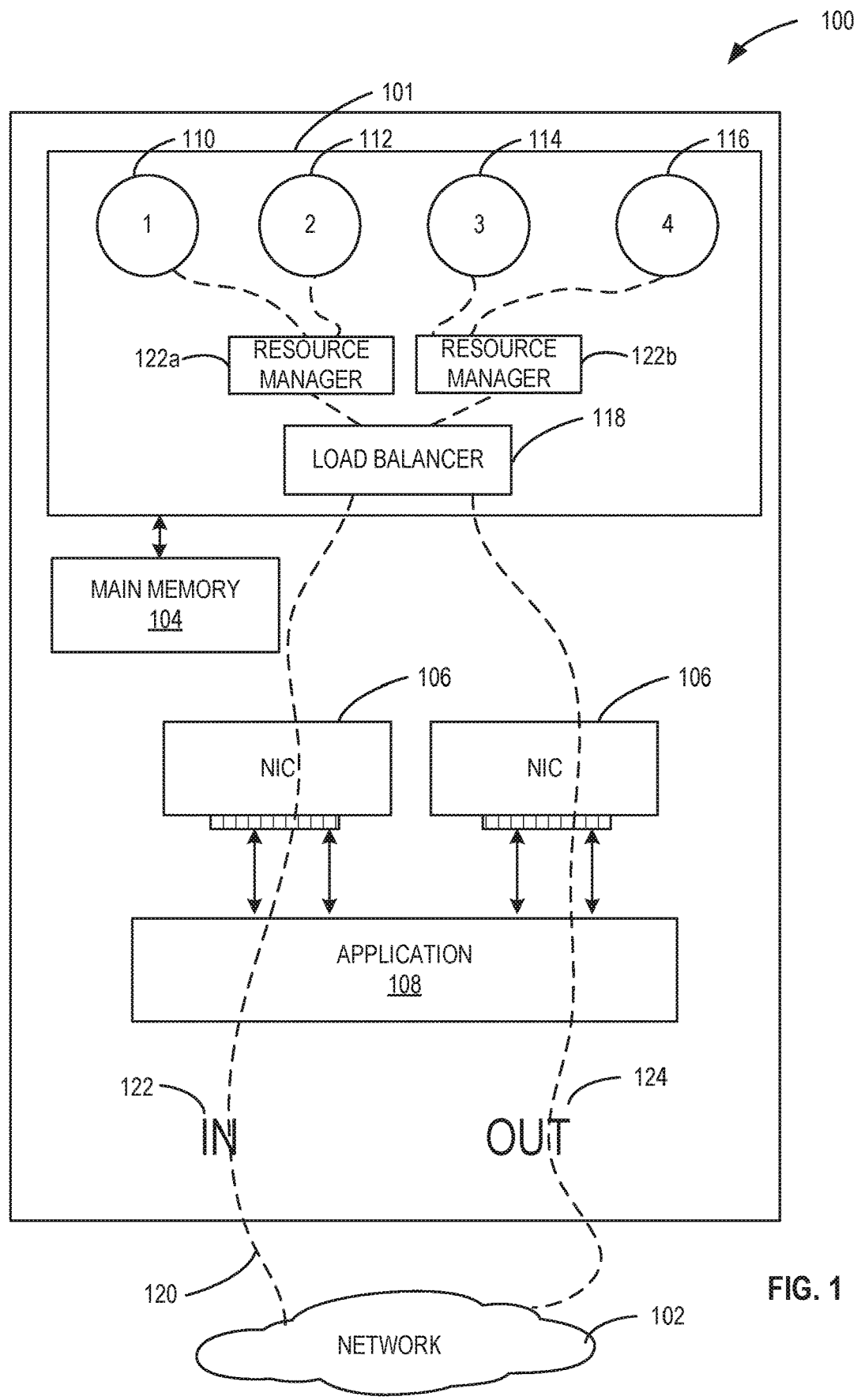
FIG. 1 is an illustration of an example implementation of a multi-core computing system to control execution of forward and inverse function tasks.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In data processing and data transfers, data is currently protected from software to within device platforms with cyclic redundancy checks (CRCs). A CRC is an error detecting code that detects unwarranted changes to raw data. The process of performing a CRC includes a transmitter (e.g., a device, software, an application, etc.) generating and appending a check value to the raw data before transmitting to a receiver (e.g., a device platform requesting the data). The receiver generates a check value responsive to receiving the data and compares the two check values to determine if they match. If the check values do not match, the data may be considered corrupt. Some corrective actions may be taken by the receiver in order to obtain the correct data from the transmitter. If the check values do match, the receiver processes and/or stores the data. Therefore, data is protected during transfer from a transmitting device and/or transmitting software to a receiving device.

However, data may not be protected within device platforms. For example, when check values are verified (e.g., when the check values match), data is sent to processing elements for processing (e.g., encrypting, decrypting, compressing, decompressing, etc.) and, in some examples, those processing elements are faulty. In this manner, the data can become corrupted due to the faulty processing element. Conventional methods to protect data within device platforms includes dual modular redundancy and triple modular redundancy.

Dual modular redundancy (DMR) is the process of duplicating and/or abstracting a processing engine and submitting data to both processing engines for the same task in order to compare outputs. For example, in dual modular redundancy, two engines obtain the same data, perform the same job and/or task (e.g., encryption, decryption, Fast Fourier transform (FFT), etc.) on the data, and compare the output data. The outputs of both engines must match for the job to be considered successful.

Triple modular redundancy (TMR) is a similar process to DMR except a task and/or job is submitted to three identical processing engines instead of two. In TMR, the outputs of the three processing engines are submitted to a majority voting system that identifies the correct output (e.g., identifies non-corrupt data) based on a 2 to 1 vote. For example, if two of the outputs are matching and one is not, the value of the two matching outputs is the correct value. If two or more of the outputs are not matching, there is no correct value and the job is considered a fail.

In these conventional methods, two to three times the resources are needed in order for the device platform to enable TMR and/or DMR. In some examples, resources include central processing units (CPUs), random-access memory (RAM), cache space, network throughput, electrical power, input/output operations, direct memory access (DMA) channels, external memory, etc. These extra resources increase a bill of materials (BOM) cost for the device platform and additionally increase the processing time it takes to process data transfers.

Examples disclosed herein verify data within a device platform utilizing a single pass flow (e.g., the data is processed once). Examples disclosed herein specifically target packet processing (e.g., the analyzing and storing of a network packet) and its end-to-end stages. For example, in packet processing, a device obtains data packets from the network and goes through stages of encrypting, storing, decrypting, and transmitting. In such an example, examples disclosed herein detect silent data corruption errors occurring in data processing (e.g., the encrypting and/or decrypting stages) based on keeping track of which elements are performing the tasks on the data. However, examples disclosed herein are not limited to packet processing. For example, examples disclosed herein can be implemented by wireless signal processing systems, data compression systems, etc.

Examples disclosed herein include a response controller that identifies the source (e.g., core, engine, element, entity, etc.) of the processed data and tags the processed data with an identifier corresponding to the source. This enables a workload controller, such as a load balancer, to ensure that a different processing entity is used for a reverse processing operation on the data. Examples disclosed herein mitigate double errors that may be caused by a faulty processor executing both forward and inverse operations. Double errors can occur when the same faulty entity is used to generate and validate the data, resulting in an incorrect validity check.

FIG. 1 is an illustration of an example implementation of an example multi-core computing system 100 coupled to an example network 102 to control execution of forward and inverse function tasks. The example multi-core computing system 100 includes an example processor 101, an example main memory 104, example network interface cards (NICs) 106, and an example application (e.g., a firmware and/or software application) 108. The example processor 101 includes an example first core 110, an example second core 112, an example third core 114, an example fourth core 116, an example load balancer 118, and example resource managers 122.

In FIG. 1, the example multi-core computing system 100 can implement a distributed unit (DU), a centralized unit (CU), and/or a core device. In examples disclosed herein, a DU and/or a CU are edge servers (e.g., 5G edge servers), such as multi-core edge servers, that can effectuate a distribution of data flows (e.g., communication flows, packet flows, a flow of one or more data packets, etc.) 120 through the network 102 to a different destination (e.g., a 5G device environment, a core network, etc.). In examples disclosed herein, a core device is a multi-core server (e.g., physical server, virtual server, etc., and/or a combination thereof). Additionally and/or alternatively, a core device may be any type of computing device. In some examples, the multi-core computing system 100 can implement a computing device in a wireless environment, the wireless environment to facilitate the execution of computing tasks using a wireless network (e.g., network 102).

In FIG. 1, the example multi-core computing system 100 includes the example processor 101 to perform one or more computing tasks. For example, the processor 101 includes cores 110, 112, 114, and 116 that perform tasks based on data obtained from the network 102 via the data flow 120. In some examples, the cores 110, 112, 114, 116 perform forward and inverse tasks on the data obtained from the network 102. For example, a forward task includes encryption, compression, FFT, and/or any other task/job that includes a corresponding inverse task/job. An inverse task includes decryption, decompression, inverse FFT, and/or any other task/job that reverses a previous task/job. In some examples disclosed herein, the cores 110, 112, 114, 116 encrypt data. For example, the cores 110, 112, 114, 116 implement encryption algorithms to safely store data in the main memory 104. In other examples, the cores 110, 112, 114, 116 decrypt data. For example, the cores 110, 112, 114, 116 implement decryption algorithms and/or decryption methods such as counter mode (CTR) decryption. In some examples, some of the cores 110, 112, 114, 116 encrypt data and decrypt data. For example, any of the cores 110, 112, 114, 116 can be used to encrypt and/or decrypt data.

In FIG. 1, the cores 110, 112, 114, 116 may be in clusters. For example, the first core 110 and the second core 112 are included in a first cluster and the third core 114 and fourth core 116 are included in a second cluster. In examples disclosed herein, a cluster is a set of loosely or tightly connected processor cores that work together so that they can be viewed as a single processing system. In a multi-core computing system (e.g., such as the multi-core computing system 100 of FIG. 1), the plurality of cores are used to speed up processing of data. For example, large data flows that require a significant amount of processing can be split up among the plurality of cores 110, 112, 114, 116 in order to quickly complete a job. In examples disclosed herein, the multi-core computing system 100 includes the plurality of cores 110, 112, 114, 116 to not only speed up processing time, but to also ensure that a different core executes an inverse tasks (e.g., decryption, decompression, etc.) than the core that executes a forward task (e.g., encryption, compression, etc.). As such, the cores 110, 112, 114, 116 include controllers that generate descriptors, such as response descriptors and request descriptors, that inform an entity (e.g., a other cores, NICs 106, application 108, load balancer 118, etc.) of how data was processed. The example cores 110, 112, 114, 116 are described in further detail below in connection with FIG. 2.

In FIG. 1, the example multi-core computing system 100 includes an example main memory 104 to store data corresponding to the data flow 120. In some examples, the cores 110, 112, 114, 116 store data in the main memory 104. In some examples the NICs 106 store data in the main memory 104. In some examples, the application 108 stores data in the main memory 104. In some examples, the main memory 104 is communicatively coupled to the processor 101. In other examples, the main memory 104 is directly coupled to the processor 101 via hardwired connection. In this manner, the example processor 101 can access data stored in the example main memory 104.

In FIG. 1, the example multi-core computing system 100 includes example NICs 106 to receive data packets from the data flow 120. In some examples, the NICs 106 can spray packets randomly via receive side scaling (RSS) thereby reducing bandwidth associated with the cores 110, 112, 114, 116 and/or, more generally, the processor 101 that includes the cores 110, 112, 114, 116. In other examples, the NICs 106 can distribute the data packets of the data flow 120 to a single one of the cores 110, 112, 114, 116 based on information associated with the data packets. For example, the NICs 106 may discover and/or read information in the data packet descriptors to determine which cores 110, 112, 114, 116 are to process the data packets.

In some examples, the application 108 directs the data flow 120 from an input 122 to the processor 101 via a first one of the NICS 106. In some examples, the cores 110, 112, 114, 116 and/or more generally, the processor 101 can transmit processed data packet(s) to an output 124 via a second one of the NICs 106 and/or the application 108. Although two instances of the NICs 106 are depicted in FIG. 1, alternatively the two instances may be combined into a single instance and/or a different number of the NICs 106 may be used.

In FIG. 1, the example multi-core computing system 100 includes the example application 108 to direct, manage, etc., the example data flow 120. In some examples, the application 108 performs processing tasks on data packets in the data flow 120, such as encryption and compression tasks. In some examples, the application 108 communicates with an application programming interface (API) via the network 102. In some examples, the application 108 determines which one(s) of the cores 110, 112, 114, 116 are to execute tasks associated with the data flow 120. For example, specific tasks associated with the application 108 may execute faster and/or more efficiently on a designated accelerator (e.g., an FPGA, a GPU, a cryptographic accelerate), in which the application 108 would assign a specific task to. In some examples, the application 108 labels (e.g., concatenates, appends, etc.) the data flow 120 with a core identifier (ID) to indicate which core (e.g., one of the cores 110, 112, 114, 116) the data flow 120 is to be directed.

In FIG. 1, the example processor 101 includes the example load balancer 118 to improve load balancing and workload distribution in the multi-core computing system 100. In some examples, the load balancer 118 distributes the data flow 120 to specific ones of clusters of cores 110, 112, 114, 116 based on the cluster availability (e.g., available resources associated with the cluster). The example load balancer 118 can distribute the data flow 120 based on a scheduling type (e.g., atomic scheduling, ordered scheduling, etc.) to one or more cores 110, 112, 114, 116, receive the processed data flow 120 from the one or more cores 110, 112, 114, 116, and re-order and/or aggregate the processed data flow 120 in preparation for distribution and/or transmission to different hardware, a different logic entity, etc.

In FIG. 1, the processor 101 includes example resource managers 122a and 122b, collectively resource managers 122, to direct the data flow 120 to one of the cores in a cluster. In FIG. 1, an example first resource manager 122a manages the first cluster containing and/or including the first core 110 and the second core 112. In FIG. 1, an example second resource manager 122b manages the second cluster containing and/or including the third core 114 and the fourth core 116. The example resource managers 122 determine which core in the cluster is to process the data flow 120 responsive to receiving the data flow 120 from the example load balancer 118. For example, the resource managers 122 distribute the data flow 120 to a specific core based on the core identifier (ID) associated with the data flow 120. For example, the resource managers 122 may read and/or analyze descriptors concatenated and/or appended to the data packet(s) of the data flow 120. The example resource managers 122 are described in further detail below in connection with FIG. 3.

In some examples, the resource managers 122 implement example means for distributing and/or managing. The means for distributing and/or managing is implemented by executable instructions such as that implemented by at least blocks 702, 704, 706, 708, and 710 FIG. 7. The executable instructions of blocks 702, 704, 706, 708, and 710 FIG. 7 may be executed on at least one processor such as the example processor 812 of FIG. 8. In other examples, the means for distributing and/or managing is implemented by hardware logic, hardware implemented state machines, logic circuitry, and/or any other combination of hardware, software, and/or firmware.

Figure 2:
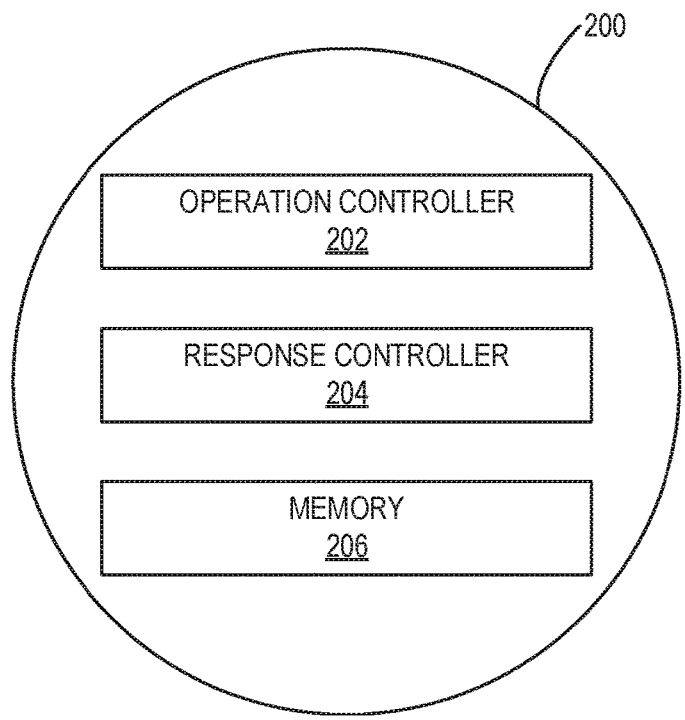
FIG. 2 is a block diagram illustrating an example core of the multi-core computing system of FIG. 1.

Turning to FIG. 2, a block diagram of an example core 200 is illustrated. The example core 200 can implement any of the cores 110, 112, 114, 116 in the clusters of FIG. 1. The example core 200 includes an example operation controller 202, an example response controller 204, and an example memory 206.

In FIG. 2, the example core 200 includes the example operation controller 202 to perform operations on data flows (e.g., data flow 120 of FIG. 1). The example operation controller 202 implements forward and inverse computing functions, such as compression and decompression, encryption and decryption, FFT and inverse FFT, etc. For example, the operation controller 202 transforms data flows based on specific computing functions. In examples disclosed herein, the operation controller 202 implements CRC techniques. For example, the operation controller verifies integrity checks on the data packets in the data flow 120. In this manner, the data packets coming off a network (e.g., the network 102 of FIG. 1) or an application (e.g., the application 108 of FIG. 1) are analyzed and verified to protect the core 200 from any type of corruption. Additionally, packets coming off the core 200 to an application (e.g., the application 108 of FIG. 1) or a network (e.g., the network 102 of FIG. 1) are analyzed and verified to protect the data and the application and/or network. The example operation controller 202 is in communication with the example response controller 204, the example memory 206, an example resource manager (e.g., first resource manager 122a and/or second resource manager 122b of FIG. 1), a load balancer (e.g., the load balancer 118 of FIG. 1), one or more NICs (e.g., the NICs 106 of FIG. 1), and one or more applications (e.g., the application 108 of FIG. 1).

In some examples, the operation controller 202 implements example means for controlling operations and/or controlling core operations. The means for controlling operations and/or controlling core operations is implemented by executable instructions such as that implemented by at least blocks 602, 604, 606, 608 610, 614, and 620 FIG. 6. The executable instructions of 602, 604, 606, 608 610, 614, 620, and 622 FIG. 5 may be executed on at least one processor such as the example processor 812 of FIG. 8. In other examples, the means for controlling operations and/or controlling core operations is implemented by hardware logic, hardware implemented state machines, logic circuitry, and/or any other combination of hardware, software, and/or firmware.

In FIG. 2, the example core 200 includes the example response controller 204 to control the generation of response descriptors. As used herein, a descriptor is information that describes how data (e.g., data packets, the data flow, etc.) is processed on a request side (e.g., processed by the application 108 of FIG. 1) or how it was processed by a device (e.g., the core 200) on the response side. In some examples, the request side provides the response side with a request descriptor. For example, a request descriptor corresponding to an application that desires the response side to encrypt a data flow (e.g., data flow 120 of FIG. 1) includes information such as plaintext, encryption keys, algo, configuration, core IDs to be used for an encryption, buffer addresses (e.g., inputs, outputs), etc. In some examples, the response side includes any software, firmware, and/or hardware that performs a request. For example, a response descriptor corresponding to a core (e.g., core 200) that performs encryption and/or decryption includes information such as ciphertext/plaintext, integrity check status flag (e.g., success, fail, exception, etc.), core IDs, etc.

The example response controller 204 obtains information, corresponding how data is processed, from the operation controller 202 and/or the memory 206. In some examples, the response controller 204 generates a string of data including all of the processing information. In other examples, the response controller 204 generates an array of bits, where each bit corresponds to a type of data (e.g., encryption key, status flag, core ID, configuration, algo, etc.). In some examples, the response controller 204 concatenates, appends, combines, etc., the array of bits to the plaintext (e.g., untouched input data and/or decrypted data), (e.g., encrypted data and/or unreadable output of an encryption algorithm), and/or to any other type of processed data.

In some examples, the response controller 204 sends the descriptor(s) to a NIC (e.g., one of the NICs 106 of FIG. 1), to an application (e.g., the application 108 of FIG. 1), to a network (e.g., the network 102 of FIG. 1), and/or to memory (e.g., the memory 206, the main memory 104 of FIG. 1, etc.). In some examples, the application 108 of FIG. 1 directs the flow of the descriptor based on the data flow 120. In other examples, the load balancer 118 of FIG. 1 directs the flow of the descriptor.

In some examples, the response controller 204 implements example means for controlling generation of response descriptors. The means for controlling generation of response descriptors is implemented by executable instructions such as that implemented by at least blocks 612, 616, and 618 FIG. 6. The executable instructions of 612, 616, and 618 FIG. 6 may be executed on at least one processor such as the example processor 812 of FIG. 8. In other examples, the means for controlling generation of response descriptors is implemented by hardware logic, hardware implemented state machines, logic circuitry, and/or any other combination of hardware, software, and/or firmware.

In FIG. 2, the core 200 includes the example memory 206 to store data input and output to the operation controller 202 and the response controller 204. For example, the memory 206 stores compressed and/or encrypted data submitted by an application (e.g., the application 108 of FIG. 1). In examples disclosed herein, the memory 206 is implemented by a cache. In other examples, the memory 206 is implemented by magnetic-core memory, system memory, main memory of a computing system (e.g., the main memory 104 of the multi-core computing system 100 of FIG. 1), and/or any other type of memory. The example memory 206 may be accessed by any core in the multi-core processor 101 of FIG. 1, by the example resource managers 122 of FIG. 1, by the example load balancer 118 of FIG. 1, by the example application 108 of FIG. 1, by the example NICs 106 of FIG. 1, and/or by the example main memory 104 of FIG. 1.

Figure 3:
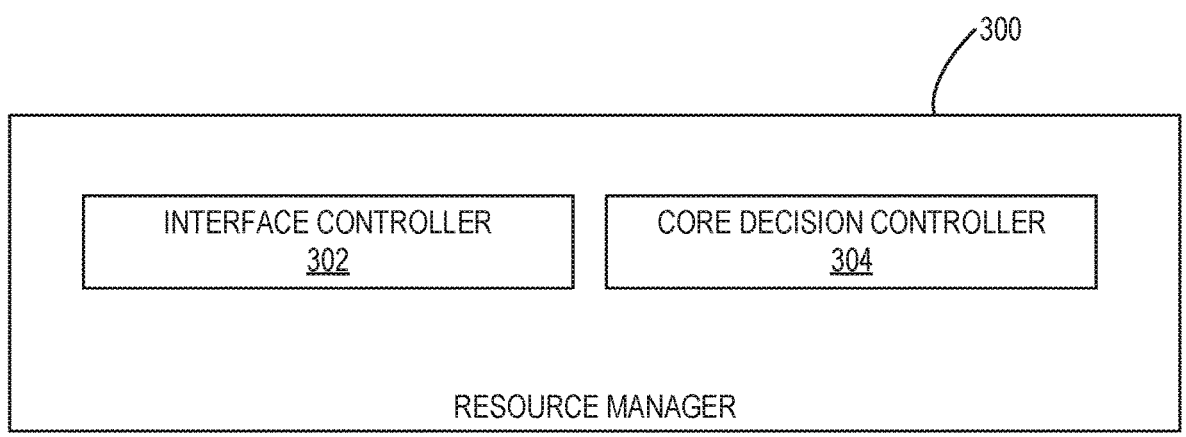
FIG. 3 is a block diagram illustrating an example resource manager of the multi-core computing system of FIG. 1.

Turing to FIG. 3, a block diagram of an example resource manager 300 is illustrated. The example resource manager 300 can implement any of the resource managers 122a, 122b of FIG. 1. The example resource manager 300 includes an example interface controller 302 and an example core decision controller 304.

In FIG. 3, the example resource manager 300 includes the example interface controller 302 to obtain a request to perform an operation on a data flow (e.g., data flow 120 of FIG. 1). In some examples, the interface controller 302 is a communication controller that receives and sends data and/or instructions to different processing elements (e.g., processor cores, load balancers, etc.). In some examples, the interface controller 302 submits a request to the core decision controller 304 for analyzing a data flow. In some examples, the interface controller 302, and/or more generally the resource manager 300, enables corresponding cores (e.g., cores managed by the resource manager 300) to update output data (e.g., transformed data) with core IDs in the response descriptors. For example, the interface controller 302 may query the corresponding cores for a response descriptor including the transformed data and the core ID.

In some examples, the interface controller 302 implements example means for obtaining and sending data requests. The means for obtaining and sending data requests is implemented by executable instructions such as that implemented by at least blocks 702, 708, and 710 of FIG. 7. The executable instructions of 702, 708, and 710 of FIG. 7 may be executed on at least one processor such as the example processor 812 of FIG. 8. In other examples, the means for obtaining and sending data requests is implemented by hardware logic, hardware implemented state machines, logic circuitry, and/or any other combination of hardware, software, and/or firmware.

In FIG. 3, the resource manager 300 includes the example core decision controller 304 to determine the type of operation requested in the data flow and define which processing core identifier to perform the operation. The example core decision controller 304 determines whether the data in the data flow has been forward processed or not. For example, the core decision controller 304 identifies whether the request descriptor includes ciphertext for decryption, compressed data for decompression, etc.

In some examples, if the core decision controller 304 determines the data in the data flow has been forward processed, the core decision controller 304 sends the data flow to a core different than the forward processing core. For example, the core decision controller 304 analyzes a response descriptor, corresponding to the request obtained at the interface controller 302, to identify a core used to perform the forward operation. In some examples, the core decision controller 304 can identify the core used to perform the forward operation based on a core ID in the response descriptor. The example core decision controller 304 selects a core ID, different than the core ID in the response descriptor corresponding to the request, to perform the operation of the request. The core decision controller 304 is not limited to analyzing requests for data that has been forward processed. The core decision controller 304 continuously analyzes the requests for the type of data and the type of operation that is to be performed in order to make a decision about which core in the cluster to send the data flow to. In some examples, the core decision controller 304 notifies the interface controller 302 of the selected core.

In some examples, the core decision controller 304 implements example means for determining a core for processing. The means for determining a core for processing is implemented by executable instructions such as that implemented by at least blocks 704 and 706 of FIG. 7. The executable instructions of 704 and 706 of FIG. 7 may be executed on at least one processor such as the example processor 812 of FIG. 8. In other examples, the means for determining a core for processing is implemented by hardware logic, hardware implemented state machines, logic circuitry, and/or any other combination of hardware, software, and/or firmware.

Returning to FIG. 1, an example operation of the implementation of the multi-core computing system 100 of FIG. 1 to encrypt and decrypt the data flow 120 will now be described. In the example operation, the application 108 submits a request to the processor 101 via a first one of the NICs 106 to store data of the data flow 120 securely (e.g., to encrypt the data flow). The example application 108 includes processing information (e.g., a request descriptor) in the request. For example, the application 108 identifies the desired core (e.g., the first one of the cores 110) for processing, the key, the configuration, etc.

In the example operation, the load balancer 118 obtains the request and determines where to direct the data flow 120. For example, the load balancer 118 may query the resource managers 122 for resource availability of the clusters. In some examples, if the cluster containing the desired processing core (e.g., the first one of the cores 110) is not available, the load balancer 118 enqueues data (e.g., add and/or otherwise place an element, such as a queue element, onto a queue) from the unavailable cluster (e.g., the first cluster including the first one of the cores 110) to a different cluster (e.g., the third or fourth one of the cores 114, 116). For example, the load balancer 118 directs the data flow 120 to a cluster that is available (e.g., includes an appropriate amount of computing resources) for encrypting the data flow 120. In some examples, a cluster may be unavailable when its one or more cores are processing a different data flow, when the cluster does not have enough resources to process the size of the data flow 120, when the cluster does not include the compute abilities to perform the request on the data flow 120, etc.

In the example operation, the desired first resource manager 122a obtains the data flow 120 (e.g., when the first cluster is available) and determines which core (110, 112) in the cluster can process the data flow 120. In some examples, the first resource manager 122a determines which core (110, 112) based on the request descriptor corresponding to the data flow 120. In other examples, the first resource manager 122a determines which core (110, 112) based on the core availability. The example first resource manager 122a sends the data flow 120 to the desired and/or available processing core (e.g., first core 110). The desired processing core (e.g., core 110) obtains the data flow 120 and the processing information from the first resource manager 122a. In some examples, the first core 110 utilizes the request descriptor corresponding to the data flow to perform the encryption task (e.g., utilizes the key and configuration).

In the example operation, the core 110 performs an integrity check for the data flow 120. For example, the core 110 generates a CRC value and/or an integrity check value and compares it to the CRC value included in the data flow 120. The terms "CRC value" and "integrity check value" are equivalent and can be used interchangeably herein. In response to the comparison between the two CRC values matching, the core 110 encrypts data in the data flow 120. For example, the data was successfully verified and the core 110 implements Advanced Encryption Standard (AES) in Counter Mode to encrypt and/or encode the data. In AES Counter Mode, the core 110 XORs the plaintext data with a counter value (e.g., an AES counter) to generate ciphertext. The core 110 generates a CRC value responsive to encrypting the data flow 120.

In the example operation, the core 110 generates a response descriptor based on the ciphertext, the core ID, the CRC value, and the CRC status. For example, the core 110 concatenates the encoded data with the core ID, the CRC value, and the "successful" status to generate the response descriptor. In some examples, the core 110 stores the response descriptor in memory, such as the main memory 104. In other examples, the core 110 submits the response descriptor to the application 108 via a second one of the NICs 106.

In the example operation, the application 108 submits a request to the processor 101 via a first one of the NICs 106 to retrieve data from storage. For example, the application 108 facilitates a request to decrypt the data flow 120. In some examples, the application 108 retrieves the response descriptor corresponding to the request. For example, the application 108 facilitates a memory query to obtain the ciphertext and processing information corresponding to the encrypted data flow 120. In some examples, the application 108 accesses the encrypted data flow 120 from the main memory 104 via one of the NICs 106.

In the example operation, the load balancer 118 obtains the request and the response descriptor from one of the NICs 106. The example load balancer 118 determines which cluster to enqueue the data flow 120 based on cluster availability, information in the request and response descriptor, the size of the data flow 120, etc. In the example operation, the load balancer 118 determines to enqueue the data flow 120 at the first cluster (including the first core 110 and second core 112).

The example first resource manager 122a obtains the data flow 120. The example first resource manager 122a analyzes the response descriptor, corresponding to the data flow 120, to determine an appropriate core to enqueue the data flow 120 to. In some examples, the resource managers 122 are trained to enqueue the data flow 120 to a core not previously used. For example, the first resource manager 122a enqueues the data flow 120 to the second one of the cores 112 because the first one of the cores 110 performed the forward task (e.g., encryption) on the data flow 120. The example resource managers 122 enqueue different processing cores for forward and inverse tasks in order to detect and/or identify faulty cores. For example, running the inverse task on a different core eliminates the possibility of a false positive scenario. A false positive scenario can occur during the AES in Counter Mode. For example, if the first core 110 is generating faulty counter values, the decryption phase of the data flow 120 will be decrypted with the same faulty counter value used during encryption and, thus, the processor 101 will not detect that the core 110 is generating faulty counter values. However, if a different core obtains the data flow 120 encrypted with the faulty counter value, the different core will try to decrypt the data flow 120 with a correct counter value and a final CRC check will fail because the plaintext will not be the original plaintext of the data flow 120 before encryption. The only time the data for the application 108 is unprotected is inside the processing core (e.g., one of the cores 110, 112, 114, 116) when the data is transformed (e.g., processed). If any errors occur within one of the cores 110, 112, 114, 116 (e.g., due to process degradation (permanent), SER events (temporal), etc.), the errors will automatically be included in the output CRC calculations and the error will not be detected with the CRC flow.

In the example operation, the example first resource manager 122a enqueues the encrypted data flow 120 to the second one of the cores 112 based on the response descriptor (e.g., the core ID corresponding to the first one of the cores 110 and tagged in the response descriptor) and the core availability.

The second one of the cores 112 obtains the request and the data flow 120 and verifies an integrity check. For example, the second core 112 generates a CRC value and compares the CRC value to the CRC value included in the data flow 120. In response to the comparison, the second core 112 updates a status flag to indicate whether the verification was successful. In some examples, if the verification was successful, the second core 112 continues to decrypt the data. In other examples, if the verification failed, the second core 112 generates a response descriptor including the ciphertext of the data flow 120, the failed status, and the identifier of the second core 112. In this manner, the example load balancer 118, the resource manager 122, and/or the example application 108 can determine that further troubleshooting is required based on the response descriptor.

In the example operation, the second core 112 decrypts the data flow 120 in response to a successful verification. In some examples, if the second core 112 is faulty, the wrong counter value may be used to decrypt the data flow 120. In this manner, during a final CRC verification, the second core 112 enables a different processing entity to observe a CRC failure on the plaintext and the error will be detected. In other examples, if the first core 110 performed a faulty encryption and the second core 112 performs an intended decryption, the second core 112 enables a different processing entity to observe a CRC failure on the plaintext and the error is detected.

In the example operation, if any of the cores performing the inverse task (e.g., the decryption task) observes a failure, the example load balancer 118, the example resource manager 122, and/or the example application 108 can move to recover the data (e.g., troubleshoot a way to correctly decrypt the data) and also isolate the faulty core from the compute resources so they do not contaminate other data flows. In some examples, the resource manager 122 may send the faulty data back to the core that performed the forward task in order to recover the data. In some examples, the application 108 and/or the load balancer 118 can inform an operator, a system manager, etc., of the faulty core to offload and/or disable the core from the multi-core computing system 100. In some examples, when a faulty core is offloaded and/or disabled, the cores can be sent through system diagnostic testing.

The benefits of implementing the response controller (e.g., the response controller 204 of FIG. 2) within the processing cores 110, 112, 114, 116 and training the resource managers 122 to select different cores for forward and inverse tasks, includes achieving end to end data integrity within the multi-core computing system 100. The examples disclosed herein enable the real time detection of faulty processing entities within the multi-core computing system 100 to be identified and isolated within the system.

Figure 4:
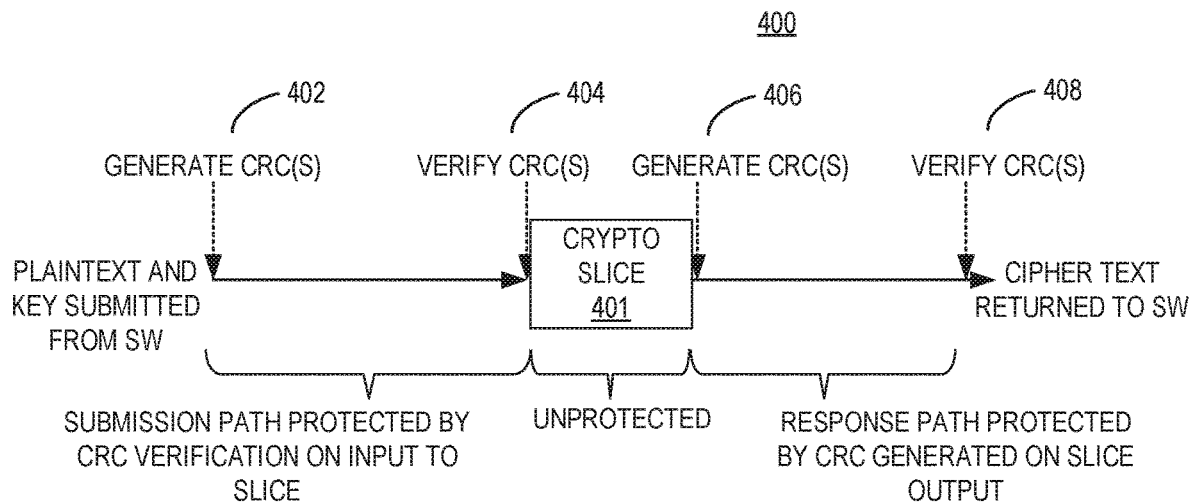
FIG. 4 is a data flow diagram for an encryption request.

FIG. 4 is a data flow diagram 400 for an encryption request. The example data flow diagram 400 includes an example cryptographic engine 401. The example cryptographic engine 401 is a module (e.g., a processor) designed to perform encryption and/or decryption operations. In FIG. 4, the example cryptographic engine 401 is an unprotected processing core. For example, the cryptographic engine 401 does not include or implement a response controller with core ID tagging and, thus, cannot detect silent faults occurring to the data in the processing stages.

In FIG. 4, an application (e.g., software and/or firmware) submits plaintext and a key to the example cryptographic engine 401 to be encrypted. The submission goes through a number of steps, including a first step 402, a second step 404, a third step 406, and a fourth step 408. Each of the steps 402, 404, 406, and 408 correspond to verifications of the data (e.g., the plaintext, key, ciphertext, etc.) in the submission.

In the example data flow diagram 400, the application generates a CRC value for the plaintext and the key at the first step 402. For example, the application can generate a CRC value based on the data in the plaintext. The application sends the data (e.g., the plaintext, key, and CRC value) to the example cryptographic engine 401 via a network. The transmission of data is protected by the CRC verification on input to the engine 401. For example, at the second step 404, the cryptographic engine 401 performs an integrity check to verify the data. In some examples, the cryptographic engine 401 generates a CRC value and compares the CRC value to the CRC value generated by the application. If the comparison indicates a match, the example cryptographic engine 401 is able to access the plaintext and the key.

In the example data flow diagram 400, the application encrypts the plaintext using the key and generates a CRC value at the third step 406. For example, the cryptographic engine 401 generates a CRC value based on the output ciphertext. The example cryptographic engine 401 responds to the application's submission by sending the ciphertext and CRC value back to the application via the network. The response path is protected by the CRC generated at the output of the cryptographic engine 401.

For example, at the fourth step 408, the application performs an integrity check to verify the data before being able to access the data. At the fourth step 408, the application can verify the integrity of the data but the application may be unaware of any errors that could have occurred during encryption of the data. If any error did occur, the application would not know how to troubleshoot because the example cryptographic engine 401 did not tag the data with a core ID.

Figure 5:
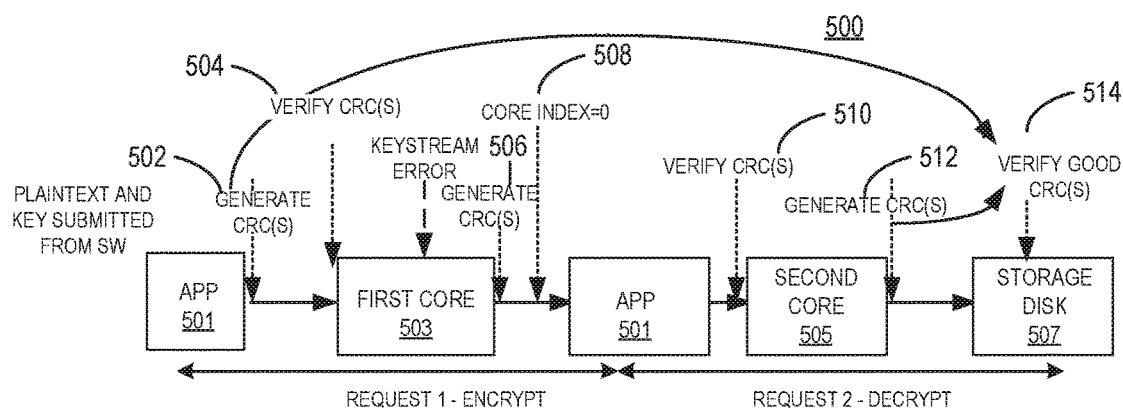
FIG. 5 is a data flow diagram for an encryption and decryption request.

FIG. 5 is a data flow diagram 500 for an encryption and decryption request. FIG. 5 includes an example application 501, an example first core 503, an example second core 505, and an example storage disk 507. In FIG. 1, the example first core 503 and second core 505 are cryptographic engines. The example first core 503 and the example second core 505 implement an example response controller (e.g., response controller 204 of FIG. 2) to generate response descriptors having core identifiers. In FIG. 5, the example first core 503 is associated with ID 0 and the example second core 505 is associated with ID 1. In FIG. 5, the example application 501 is software and/or firmware that is designed to store personal information (e.g., user information such as social security number, credit card information, etc.).

In FIG. 5, the example application 501 submits plaintext and a key to the example first core 503 to be encrypted. The first submission goes through a number of steps, including a first step 502, a second step 504, a third step 506, and a fourth step 508. In FIG. 5, the example application 501 submits ciphertext to the example second core 505 to be decrypted. The second submission does through a number of steps, including a fifth step 510, a sixth step 512, and a seventh step 514.

In an example operation of the data flow diagram 500, the application 501 generates a first CRC value at step 502 based on the plaintext and key. The first CRC value is sent to the example first core 503 with the plaintext and key. At the second step 504, the example first core 503 performs an integrity check to verify the data before accessing the plaintext and key. In some examples.

In response to verifying the data submitted by the example application 501, the example first core 503 encrypts the plaintext with the key. For example, the first core 503 generates ciphertext. In FIG. 5, the first core 503 is a faulty core and, thus, an error occurs during generation of the ciphertext. In some examples, the error is caused by XORing the plaintext with the wrong key to generate the ciphertext. However, any type of error may exist during processing of the data submitted by the application 501.

At the example third step 506, the first core 503 generates a CRC value based on the ciphertext. In some examples, the CRC value protects faulty ciphertext. At the example fourth step 508, the first core 503 generates a response descriptor. The response descriptor includes the core ID 0, CRC value, and ciphertext, among other information and data.

In an example operation of the data flow diagram 500, the example application 501 obtains and stores the response descriptor responsive to the output from the first core 503. For example, the application 501 may facilitate and/or direct the response descriptor to be stored in the system memory until a user requests the data in the response descriptor.

In this manner, the example application 501 submits a second request responsive to a user requesting the stored data. For example, the user requests personal information that was safely stored at the system memory. In some examples, the application 501 submits the second request to a load balancer (hardware not illustrated). In such an example, the load balancer determines where to direct the data for decryption. For example, the load balancer analyzes the response descriptor corresponding to the data to determine what core previously processed the data. In this manner, the load balancer selects the second core 505 to decrypt the data based on the core ID 0 tagged in the response descriptor.

In the example data flow diagram 500, the example second core 505 obtains the data and performs an integrity check at the fifth step 510. The example second core 505 accesses and decrypts the data responsive to the successful verification of the data. The example second core 505 may output faulty plaintext (e.g., plaintext not matching the original plaintext submitted by the application 501). For example, the second core 505 attempts to decrypt data with a correct key, but the data was encrypted with an incorrect key at the first core 503. Therefore, the plaintext output of the second core 505 may not match the plaintext output of the application 501 at the beginning steps of the data flow diagram 500.

In the example data flow diagram 500, the example second core 505 generates a CRC value for the decrypted data and a response descriptor at the sixth step 512. In response to generating the CRC value for the decrypted data and the response descriptor, the example second core 505 sends (e.g., stores) the data to the example storage disk 507.

The example storage disk 507 performs an integrity check at the seventh step 514. The example storage disk 507 performs the integrity check based on a comparison between the first CRC value generated at the first step 502 and the last CRC value generated at the sixth step. In some examples, if the comparison is not indicative of a match, the storage disk 507 may notify the application 501 and/or any other processing hardware of the computing system implementing the application 501. In this manner, the example application 501 can troubleshoot utilizing the core IDs stored in the response descriptors from the cores 503, 505.

While an example manner of implementing the multi-core computing system 100 of FIG. 1 is illustrated in FIGS. 1-3, one or more of the elements, processes and/or devices illustrated in FIGS. 1-3 may be combined, divided, rearranged, omitted, eliminated and/or implemented in any other way. Further, the example processor 101, the example NICs 106, the example application 108, the example load balancer 118, the example resource managers 122, the example first core 110, the example second core 112, the example third core 114, the example fourth core 116, the example core 200, the example operation controller 202, the example response controller 204, the example resource manager 300, the example interface controller 302, the example core decision controller 304, and/or, more generally, the example multi-core computing system 100 of FIG. 1 may be implemented by hardware, software, firmware and/or any combination of hardware, software and/or firmware. Thus, for example, any of the example processor 101, the example NICs 106, the example application 108, the example load balancer 118, the example resource managers 122, the example first core 110, the example second core 112, the example third core 114, the example fourth core 116, the example core 200, the example operation controller 202, the example response controller 204, the example resource manager 300, the example interface controller 302, the example core decision controller 304, and/or, more generally, the example multi-core computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 101, the example NICs 106, the example application 108, the example load balancer 118, the example resource manager 122, the example first core 110, the example second core 112, the example third core 114, the example fourth core 116, the example core 200, the example operation controller 202, the example response controller 204, the example resource manager 300, the example interface controller 302, and/or the example core decision controller 304 is/are hereby expressly defined to include a non-transitory computer readable storage device or storage disk such as a memory, a digital versatile disk (DVD), a compact disk (CD), a Blu-ray disk, etc. including the software and/or firmware. Further still, the example multi-core computing system 100 of FIG. 1 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
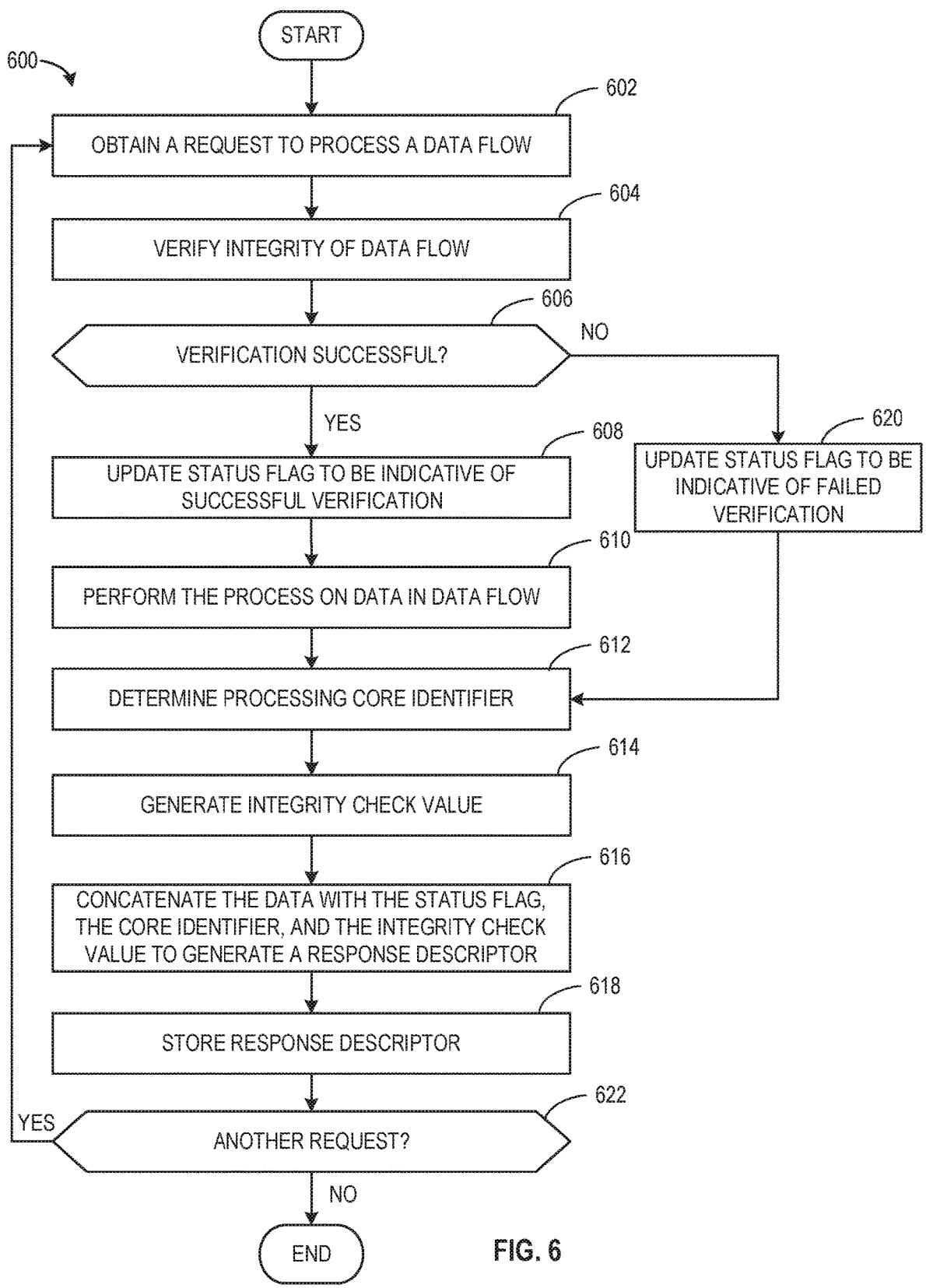
FIG. 6 is a flowchart representative of machine readable instructions which may be executed to implement an example core of the multi-core computing system of FIG. 1 to process data.
Figure 7:
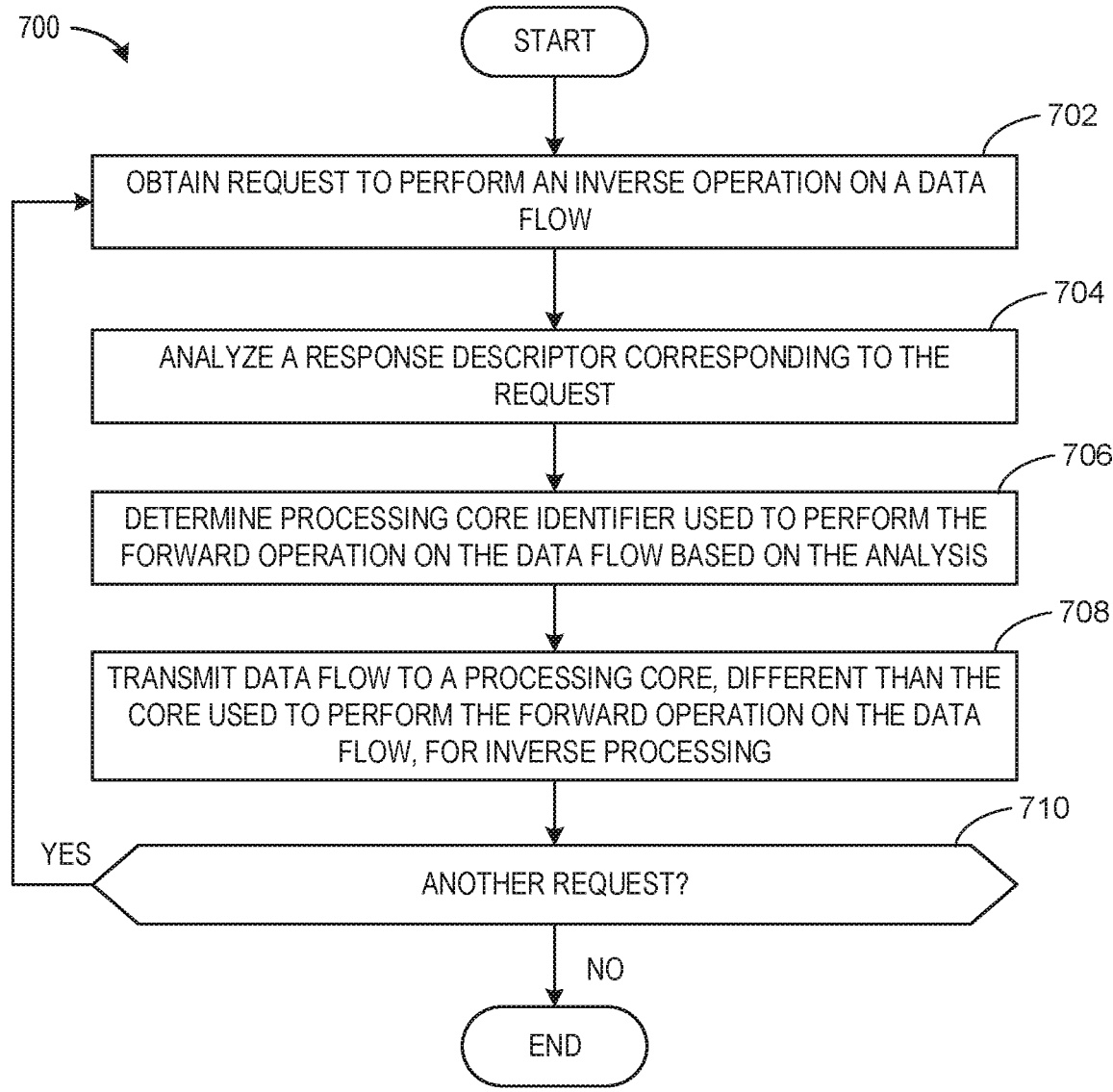
FIG. 7 is a flowchart representative of machine readable instructions which may be executed to implement an example load balancer of the multi-core computing system of FIG. 1.

Flowcharts representative of example hardware logic, machine readable instructions, hardware implemented state machines, and/or any combination thereof for implementing the multi-core computing system 100 of FIG. 1 are shown in FIGS. 6 and 7. The machine readable instructions may be one or more executable programs or portion(s) of an executable program for execution by a computer processor and/or processor circuitry, such as the processor 812 shown in the example processor platform 800 discussed below in connection with FIG. 8. The programs may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 6 and 7, many other methods of implementing the example multi-core computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine readable instructions 600 which may be executed to implement the example core 200 of FIG. 2 to process data. Although reference will be made to the example core 200 of FIG. 2, any one of the cores 110, 112, 114, and/or 116 can be implemented by the machine readable instructions 600.

The machine readable instructions 600 include block 602 where the example core 200 obtains a request to process a data flow. For example, an application submits data (e.g., plaintext and a key, ciphertext, etc.) to the core 200 via a NIC (e.g., a first one of the NICs 106 of FIG. 1). In some examples, the core 200 obtains the data flow from a load balancer (e.g., the load balancer 118 of FIG. 1).

The example core 200 verifies the integrity of the data flow (block 604). For example, the operation controller 202 performs an integrity check based on generating a CRC value and comparing the CRC value to a CRC value included in the data flow.

The example core 200 determines if the verification was successful (block 606). For example, the operation controller 202 determines if the comparison of the two CRC values is indicative of a match.

If the example core 200 determines the comparison is indicative of a match (e.g., block 606 returns a value YES), the example core 200 updates a status flag to be indicative of a successful verification (block 608). For example, the core 200 includes a status flag that is updated upon retrieval of data and cleared upon transmission of data. The status flag is used to indicate whether the data passed the cyclic redundancy check.

The example core 200 performs the process on the data in the data flow (block 610). For example, the operation controller 202 may implement an AES in Counter Mode to encrypt plaintext data based on a counter value. In some examples, the operation controller 202 implements AES in Counter Mode to decrypt ciphertext data based on a counter value. The example core 200 performs any forward and/or inverse task on the data. In some examples, the operation controller 202 outputs the processed data to the response controller 204.

The example core 200 determines the processing core identifier (block 612). For example, the response controller 204 determines the index of the core 200 and stores the index as the core ID in memory 206.

The example core 200 generates an integrity check value (block 614). For example, the operation controller 202 generates a CRC value based on the output data (e.g., ciphertext, plaintext, etc.).

The example core 200 concatenates the data with the status flag, the core identifier, and the integrity check value to generate a response descriptor (block 616). For example, the response controller 204 combines the information corresponding to the processing job (e.g., the encryption job, the decryption job, etc.) into a response descriptor to be informative for subsequent processing on the data flow.

The example core 200 stores the response descriptor (block 618). For example, the memory 206 stores the response descriptor locally. In some examples, the memory 206 stores the response descriptor in the main system memory. In some examples, the core 200 sends the response descriptor back to the application. In this manner, the application may store the response descriptor.

Returning to block 606, if the example core 200 determines the comparison is not indicative of a match (e.g., block 606 returns a value NO), the example core 200 updates the status flag to be indicative of a failed verification (block 620). For example, the operation controller 202 and/or the response controller 204 increment the status flag to a value that indicates the data did not pass the cyclic redundancy check. In some examples, when the integrity check fails, the data is not processed because the core 200 cannot access the data of the data flow. For example, the core 200 is to verify the data before being able to access the data for a job.

The example core 200 waits for another request (block 622). For example, the core 200 repeats the machine readable instructions 600 in response to obtaining another request to process data.

FIG. 7 is a flowchart representative of machine readable instructions 700 which may be executed to implement the example resource manager 300 of FIG. 3. Although reference is made to the resource manager 300 of FIG. 3, any of the resource managers 122a, 122b of FIG. 1 may be implemented by the machine readable instructions 700.

The machine readable instructions 700 include block 702 where the example resource manager 300 obtains a request to perform an inverse operation on a data flow. For example, the interface controller 302 obtains a request, submitted by a load balancer (e.g., the load balancer 118), to retrieve data from storage, where such data is encoded. The load balancer may direct the request to the example resource manager 300 for determining an optimal processing entity to decrypt the data flow.

The example resource manager 300 analyzes a response descriptor corresponding to the request (block 704). For example, the core decision controller 304 reads processing information corresponding to the encryption of the data flow. In some examples, the response descriptor is mapped to a memory location. In other examples, the response descriptor is the data packet of the data flow. For example, the response descriptor of encrypted data is the ciphertext plus all of the processing information associated with the ciphertext. In examples when the response descriptor does not correspond to cryptographic data, the response descriptor is the data (e.g., compressed data, decompressed data, discrete Fourier transformed data, inverse discrete Fourier transformed data, etc.) plus the processing information associated with the data.

The example resource manager 300 determines the processing core identifier used to perform the forward operation on the data flow based on the analysis (block 706). For example, the core decision controller 304 searches for a core index, a core ID, and or any numerical value corresponding to the processing entity that encrypted, compressed, etc., the data flow in the response descriptor.

The example resource manager 300 transmits the data flow to a processing core, different than the core used to perform the forward operation on the data flow, for inverse processing (block 708). For example, the interface controller 302 is notified, by the core decision controller 304, of the selected processing core for providing and/or enqueuing the data flow 120 to. The resource manager 300 acts to use two different cores for forward and inverse tasks in order to detect errors and faulty processing cores. Therefore, if a core ID 0 performed a forward task, then the resource manager 300 does not send the data flow to core ID 0 for the inverse task.

The example resource manager 300 waits for another request (block 710). For example, the machine readable instructions 700 repeat when the resource manager 300 obtains another request from a load balancer.

Figure 8:
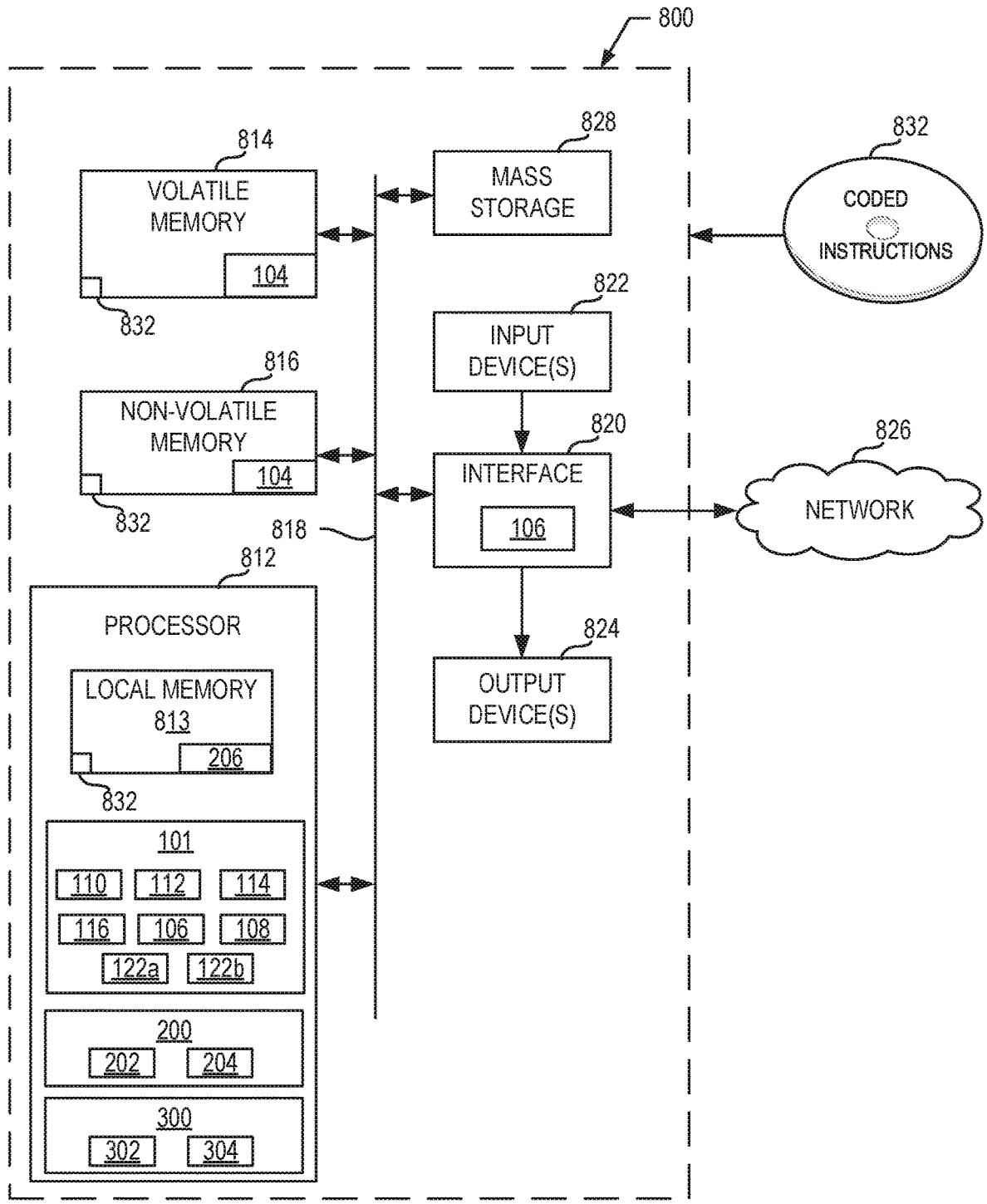
FIG. 8 is a block diagram of an example processing platform structured to execute the instructions of FIGS. 5 and 6 to implement the multi-core computing system.

FIG. 8 is a block diagram of an example processor platform 800 structured to execute the instructions of FIGS. 6 and 7 to implement the multi-core computing system 100 of FIG. 1. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the multi-core computing system 100 implements the example processor 101 including the first core 110, the second core 112, the third core 114, the fourth core 116, the load balancer 118, the resource managers 122, the NICs 106, and the application 108, the core 200, the operation controller 202, the response controller 204, the resource manager 300, the interface controller 302, and the core decision controller 304.

The processor 812 of the illustrated example includes a local memory 813 (e.g., a cache). In some examples, the local memory 813 can be implemented by the example memory 206 of FIG. 2. The processor 812 of the illustrated example is in communication with a main memory 104 including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 104, 814, 816 is controlled by a memory controller.

The processor platform 800 of the illustrated example also includes an interface circuit 820. In some examples, the interface circuit 820 implements the example NICs 106. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 600, 700, collectively 832, of FIGS. 6 and 7 may be stored in the mass storage device 828, in the volatile memory 814, in the non-volatile memory 816, and/or on a removable non-transitory computer readable storage medium such as a CD or DVD.

Figure 9:
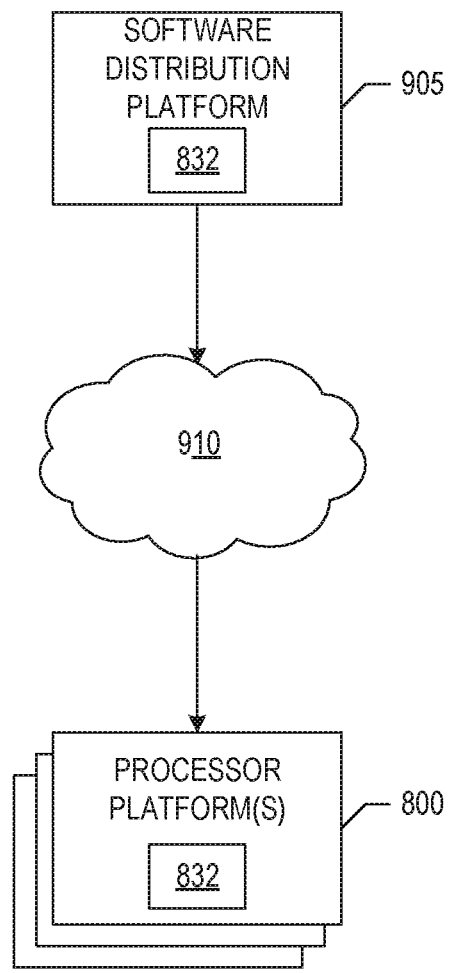
FIG. 9 is a block diagram of an example software distribution platform to distribute software (e.g., software corresponding to the example computer readable instructions of FIGS. 6 and 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 600 and 700 of FIGS. 6 and 7, as described above. The one or more servers of the example software distribution platform 905 are in communication with a network 910, which may correspond to any one or more of the Internet and/or any of the example networks 102 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 600 and 700 of FIGS. 6 and 7, may be downloaded to the example processor platform 800, which is to execute the computer readable instructions 832 to implement the multi-core computing system 100. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that control the processing location of execution of forward tasks and inverse tasks to identify faulty processing locations. Examples disclosed herein ensure that a data flow is inversely executed at a different processor core than where the data flow was forwardly executed based on tagging the processor core identifiers in the data flow. The disclosed methods, apparatus and articles of manufacture improve the efficiency of using a computing device by enabling a troubleshooting mechanism that can immediately identify where a problem occurred based on the processor core identifiers in the data flow. The disclosed methods, apparatus and articles of manufacture are accordingly directed to one or more improvement(s) in the functioning of a computer.

Example methods, apparatus, systems, and articles of manufacture to control execution of tasks in a computing system are disclosed herein. Further examples and combinations thereof include the following:

Example 1 includes an apparatus comprising at least one storage device, and at least one processor to execute instructions to at least obtain a request to perform an inverse operation on a data flow, the data flow previously transformed during a forward operation, determine a first processor core that executed the forward operation, the data flow including an identifier of the first processor core, and transmit the data flow to a second processor core to perform the inverse operation.

In Example 2, the subject matter of Example 1 can optionally include that the request is a first request, the first processor core includes circuitry, the circuitry to obtain a second request to perform the forward operation on the data flow, verify an integrity of the data flow utilizing a cyclic redundancy check, and update a status flag based on the cyclic redundancy check, the status flag to indicate a verification of the data flow.

In Example 3, the subject matter of Examples 1-2 can optionally include that the first processor core includes circuitry, the circuitry to execute the forward operation on the data flow, output a transformed data flow based on the forward operation, and generate an integrity check value corresponding to the transformed data flow, the integrity check value to be subsequently used for a cyclic redundancy check at the second processor core.

In Example 4, the subject matter of Examples 1-3 can optionally include that the first processor core includes circuitry, the circuitry to output a transformed data flow based on the forward operation, determine the identifier of the first processor core, the identifier corresponding to an index of the first processor core in the at least one processor, and generate a response descriptor based on concatenating the transformed data flow with the identifier of the first processor core.

In Example 5, the subject matter of Examples 1-4 can optionally include that the circuitry is to append a status flag to the response descriptor, the status flag based on a verification of the data flow, and append an integrity check value to the response descriptor, the integrity check value to be subsequently used for a cyclic redundancy check at the second processor core.

In Example 6, the subject matter of Examples 1-5 can optionally include that the circuitry stores the response descriptor at the at least one storage device for subsequent access by the at least one processor.

In Example 7, the subject matter of Examples 1-6 can optionally include that the second processor core includes circuitry, the circuitry to output a transformed data flow based on the inverse operation, determine an identifier of the second processor core, the identifier corresponding to an index of the second processor core in the at least one processor, generate a response descriptor based on concatenating the transformed data flow with the identifier of the second processor core, and store the response descriptor at the at least one storage device for subsequent access by the at least one processor.

Example 8 includes a non-transitory computer readable storage medium comprising instructions that, when executed, cause one or more processors to at least obtain a request to perform an inverse operation on a data flow, the data flow previously transformed during a forward operation, determine a first processor core that executed the forward operation, the data flow including an identifier of the first processor core, and transmit the data flow to a second processor core to perform the inverse operation.

In Example 9, the subject matter of Example 8 can optionally include that, wherein the request is a first request and the instructions, when executed, cause the one or more processors to obtain a second request to perform the forward operation on the data flow, verify an integrity of the data flow utilizing a cyclic redundancy check, and update a status flag based on the cyclic redundancy check, the status flag to indicate a verification of the data flow.

In Example 10, the subject matter of Examples 8-9 can optionally include that the instructions, when executed, cause the one or more processors to execute the forward operation on the data flow, output a transformed data flow based on the forward operation, and generate an integrity check value corresponding to the transformed data flow, the integrity check value to be subsequently used for a cyclic redundancy check at the second processor core.

In Example 11, the subject matter of Examples 8-10 can optionally include that the instructions, when executed, cause the one or more processors to output a transformed data flow based on the forward operation, determine the identifier of the first processor core, the identifier corresponding to an index of the first processor core in the one or more processors, and generate a response descriptor based on concatenating the transformed data flow with the identifier of the first processor core.

In Example 12, the subject matter of Examples 8-11 can optionally include that the instructions, when executed, cause the one or more processors to append a status flag to the response descriptor, the status flag based on a verification of the data flow, and append an integrity check value to the response descriptor, the integrity check value to be subsequently used for a cyclic redundancy check at the second processor core.

In Example 13, the subject matter of Examples 8-12 can optionally include that the instructions, when executed, cause the one or more processors to store the response descriptor in at least one storage device for subsequent access by the one or more processors.

In Example 14, the subject matter of Examples 8-13 can optionally include that the instructions, when executed, cause the one or more processors to output a transformed data flow based on the inverse operation, determine an identifier of the second processor core, the identifier corresponding to an index of the second processor core in the one or more processors, generate a response descriptor based on concatenating the transformed data flow with the identifier of the second processor core, and store the response descriptor in at least one storage device for subsequent access by the one or more processors.

Example 15 includes an apparatus comprising means for obtaining a request to perform an inverse operation on a data flow, the data flow previously transformed during a forward operation, means for determining a first processor core that executed the forward operation, the data flow including an identifier of the first processor core, and means for transmitting the data flow to a second processor core to perform the inverse operation.

In Example 16, the subject matter of Example 15 can optionally include that the request is a first request, the first processor core includes means for controlling to obtain a second request to perform the forward operation on the data flow, verify an integrity of the data flow utilizing a cyclic redundancy check, and update a status flag based on the cyclic redundancy check, the status flag to indicate a verification of the data flow.

In Example 17, the subject matter of Examples 15-16 can optionally include that the first processor core includes means for controlling to executed the forward operation on the data flow, output a transformed data flow based on the forward operation, and generate an integrity check value corresponding to the transformed data flow, the integrity check value to be subsequently used for a cyclic redundancy check at the second processor core.

In Example 18, the subject matter of Examples 15-17 can optionally include that the first processor core includes means for outputting a transformed data flow based on the forward operation, means for generating, the means for generating to determine the identifier of the first processor core, the identifier corresponding to an index of the first processor core in at least one processor, and generate a response descriptor based on concatenating the transformed data flow with the identifier of the first processor core.

In Example 19, the subject matter of Examples 15-18 can optionally include that the means for generating is to append a status flag to the response descriptor, the status flag based on a verification of the data flow, and append an integrity check value to the response descriptor, the integrity check value to be subsequently used for a cyclic redundancy check at the second processor core.

In Example 20, the subject matter of Examples 15-19 can optionally include means for storing the response descriptor at an at least one storage device for subsequent access by the at least one processor.

In Example 21, the subject matter of Examples 15-20 can optionally include that the second processor core includes means for outputting a transformed data flow based on the inverse operation, means for generating to determine an identifier of the second processor core, the identifier corresponding to an index of the second processor core in at least one processor, generate a response descriptor based on concatenating the transformed data flow with the identifier of the second processor core, and means for storing the response descriptor in at least one storage device for subsequent access by at least one processor.

Example 22 includes an apparatus comprising an interface controller to obtain a request to perform an inverse operation on a data flow, the data flow previously transformed during a forward operation, and a core decision controller to determine a first processor core that executed the forward operation, the data flow including an identifier of the first processor core, and determine to transmit the data flow to a second processor core to perform the inverse operation.

In Example 23, the subject matter of Example 22 can optionally include that, wherein the request is a first request, the first processor core including an operation controller to obtain a second request to perform the forward operation on the data flow, verify an integrity of the data flow utilizing a cyclic redundancy check, and update a status flag based on the cyclic redundancy check, the status flag to indicate a verification of the data flow.

In Example 24, the subject matter of Examples 22-23 can optionally include an operation controller to execute the forward operation on the data flow, output a transformed data flow based on the forward operation, and generate an integrity check value corresponding to the transformed data flow, the integrity check value to be subsequently used for a cyclic redundancy check at the second processor core.

In Example 25, the subject matter of Examples 22-24 can optionally include an operation controller to output a transformed data flow based on the forward operation, and a response controller to determine the identifier of the first processor core, the identifier corresponding to an index of the first processor core in at least one processor, and generate a response descriptor based on concatenating the transformed data flow with the identifier of the first processor core.

In Example 26, the subject matter of Examples 22-25 can optionally include that the response controller is to append a status flag to the response descriptor, the status flag based on a verification of the data flow, and append an integrity check value to the response descriptor, the integrity check value to be subsequently used for a cyclic redundancy check at the second processor core.

In Example 27, the subject matter of Examples 22-26 can optionally include a memory to store the response descriptor at an at least one storage device for subsequent access by the at least one processor.

In Example 28, the subject matter of Examples 22-27 can optionally include an operation controller to output a transformed data flow based on the inverse operation, a response controller to determine an identifier of the second processor core, the identifier corresponding to an index of the second processor core in at least one processor, generate a response descriptor based on concatenating the transformed data flow with the identifier of the second processor core, and a memory to store the response descriptor in at least one storage device for subsequent access by the at least one processor.

Example 29 includes a method comprising obtaining a request to perform an inverse operation on a data flow, the data flow previously transformed during a forward operation, determining a first processor core that executed the forward operation, the data flow including an identifier of the first processor core, and transmitting the data flow to a second processor core to perform the inverse operation.

In Example 30, the subject matter of Example 29 can optionally include that, wherein the request is a first request, the method further including obtaining a second request to perform the forward operation on the data flow, verifying an integrity of the data flow utilizing a cyclic redundancy check, and updating a status flag based on the cyclic redundancy check, the status flag to indicate a verification of the data flow.

In Example 31, the subject matter of Examples 29-30 can optionally include executing the forward operation on the data flow, outputting a transformed data flow based on the forward operation, and generating an integrity check value corresponding to the transformed data flow, the integrity check value to be subsequently used for a cyclic redundancy check at the second processor core.

In Example 32, the subject matter of Examples 29-31 can optionally include outputting a transformed data flow based on the forward operation, determining the identifier of the first processor core, the identifier corresponding to an index of the first processor core in at least one processor, and generating a response descriptor based on concatenating the transformed data flow with the identifier of the first processor core.

In Example 33, the subject matter of Examples 29-32 can optionally include appending a status flag to the response descriptor, the status flag based on a verification of the data flow, and appending an integrity check value to the response descriptor, the integrity check value to be subsequently used for a cyclic redundancy check at the second processor core.

In Example 34, the subject matter of Examples 29-33 can optionally include storing the response descriptor at a storage device for subsequent access by the at least one processor.

In Example 35, the subject matter of Examples 29-34 can optionally include outputting a transformed data flow based on the inverse operation, determining an identifier of the second processor core, the identifier corresponding to an index of the second processor core in at least one processor, generating a response descriptor based on concatenating the transformed data flow with the identifier of the second processor core, and storing the response descriptor at a storage device for subsequent access by the at least one processor.

Example 36 is an edge computing gateway, comprising processing circuitry to perform any of Examples 29-35.

Example 37 is a base station, comprising a network interface card and processing circuitry to perform any of Examples 29-35.

Example 38 is a computer-readable medium comprising instructions to perform any of Examples 29-35.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one storage device; and
   at least one processor to execute instructions to at least:
      obtain a request to perform an inverse operation on a data flow, the data flow previously transformed during a forward operation;
      determine a first processor core that executed the forward operation, the data flow including an identifier of the first processor core; and
      transmit the data flow to a second processor core to perform the inverse operation.

2. The apparatus of claim 1, wherein the request is a first request, the first processor core includes circuitry, the circuitry to:
   obtain a second request to perform the forward operation on the data flow;
   verify an integrity of the data flow utilizing a cyclic redundancy check; and
   update a status flag based on the cyclic redundancy check, the status flag to indicate a verification of the data flow.

3. The apparatus of claim 1, wherein the first processor core includes circuitry, the circuitry to:
   execute the forward operation on the data flow;
   output a transformed data flow based on the forward operation; and
   generate an integrity check value corresponding to the transformed data flow, the integrity check value to be subsequently used for a cyclic redundancy check at the second processor core.

4. The apparatus of claim 1, wherein the first processor core includes circuitry, the circuitry to:
   output a transformed data flow based on the forward operation;
   determine the identifier of the first processor core, the identifier corresponding to an index of the first processor core in the at least one processor; and
   generate a response descriptor based on concatenating the transformed data flow with the identifier of the first processor core.

5. The apparatus of claim 4, wherein the circuitry is to:
   append a status flag to the response descriptor, the status flag based on a verification of the data flow; and
   append an integrity check value to the response descriptor, the integrity check value to be subsequently used for a cyclic redundancy check at the second processor core.

6. The apparatus of claim 5, wherein the circuitry stores the response descriptor at the at least one storage device for subsequent access by the at least one processor.

7. The apparatus of claim 1, wherein the second processor core includes circuitry, the circuitry to:
   output a transformed data flow based on the inverse operation;
   determine an identifier of the second processor core, the identifier corresponding to an index of the second processor core in the at least one processor;
   generate a response descriptor based on concatenating the transformed data flow with the identifier of the second processor core; and
   store the response descriptor at the at least one storage device for subsequent access by the at least one processor.

8. A non-transitory computer readable storage medium comprising instructions that, when executed, cause one or more processors to at least:
   obtain a request to perform an inverse operation on a data flow, the data flow previously transformed during a forward operation;
   determine a first processor core that executed the forward operation, the data flow including an identifier of the first processor core; and
   transmit the data flow to a second processor core to perform the inverse operation.

9. The non-transitory computer readable storage medium of claim 8, wherein the request is a first request and the instructions, when executed, cause the one or more processors to:
   obtain a second request to perform the forward operation on the data flow;
   verify an integrity of the data flow utilizing a cyclic redundancy check; and
   update a status flag based on the cyclic redundancy check, the status flag to indicate a verification of the data flow.

10. The non-transitory computer readable storage medium of claim 8, wherein the instructions, when executed, cause the one or more processors to:
    execute the forward operation on the data flow;
    output a transformed data flow based on the forward operation; and
    generate an integrity check value corresponding to the transformed data flow, the integrity check value to be subsequently used for a cyclic redundancy check at the second processor core.

11. The non-transitory computer readable storage medium of claim 8, wherein the instructions, when executed, cause the one or more processors to:
    output a transformed data flow based on the forward operation;

determine the identifier of the first processor core, the identifier corresponding to an index of the first processor core in the one or more processors; and generate a response descriptor based on concatenating the transformed data flow with the identifier of the first processor core.

12. The non-transitory computer readable storage medium of claim 11, wherein the instructions, when executed, cause the one or more processors to:

append a status flag to the response descriptor, the status flag based on a verification of the data flow; and append an integrity check value to the response descriptor, the integrity check value to be subsequently used for a cyclic redundancy check at the second processor core.

13. The non-transitory computer readable storage medium of claim 12, wherein the instructions, when executed, cause the one or more processors to store the response descriptor in at least one storage device for subsequent access by the one or more processors.

14. The non-transitory computer readable storage medium of claim 8, wherein the instructions, when executed, cause the one or more processors to:

output a transformed data flow based on the inverse operation;

determine an identifier of the second processor core, the identifier corresponding to an index of the second processor core in the one or more processors;

generate a response descriptor based on concatenating the transformed data flow with the identifier of the second processor core; and store the response descriptor in at least one storage device for subsequent access by the one or more processors.

15. An apparatus comprising:

means for obtaining a request to perform an inverse operation on a data flow, the data flow previously transformed during a forward operation;

means for determining a first processor core that executed the forward operation, the data flow including an identifier of the first processor core; and means for transmitting the data flow to a second processor core to perform the inverse operation.

16. The apparatus of claim 15, wherein the request is a first request, the first processor core includes means for controlling to:

obtain a second request to perform the forward operation on the data flow;

verify an integrity of the data flow utilizing a cyclic redundancy check; and update a status flag based on the cyclic redundancy check, the status flag to indicate a verification of the data flow.

17. The apparatus of claim 15, wherein the first processor core includes means for controlling to:

executed the forward operation on the data flow;

output a transformed data flow based on the forward operation; and generate an integrity check value corresponding to the transformed data flow, the integrity check value to be subsequently used for a cyclic redundancy check at the second processor core.

18. The apparatus of claim 15, wherein the first processor core includes:

means for outputting a transformed data flow based on the forward operation;

means for generating, the means for generating to:

determine the identifier of the first processor core, the identifier corresponding to an index of the first processor core in at least one processor; and generate a response descriptor based on concatenating the transformed data flow with the identifier of the first processor core.

19. The apparatus of claim 18, wherein the means for generating is to:

append a status flag to the response descriptor, the status flag based on a verification of the data flow; and append an integrity check value to the response descriptor, the integrity check value to be subsequently used for a cyclic redundancy check at the second processor core.

20. The apparatus of claim 19, further including means for storing the response descriptor at an at least one storage device for subsequent access by the at least one processor.

21. The apparatus of claim 15, wherein the second processor core includes:

means for outputting a transformed data flow based on the inverse operation;

means for generating to:

determine an identifier of the second processor core, the identifier corresponding to an index of the second processor core in at least one processor;

generate a response descriptor based on concatenating the transformed data flow with the identifier of the second processor core; and means for storing the response descriptor in at least one storage device for subsequent access by at least one processor.

22. An apparatus comprising:

an interface controller to obtain a request to perform an inverse operation on a data flow, the data flow previously transformed during a forward operation; and a core decision controller to:

determine a first processor core that executed the forward operation, the data flow including an identifier of the first processor core; and determine to transmit the data flow to a second processor core to perform the inverse operation.

23. The apparatus of claim 22, wherein the request is a first request, the first processor core including an operation controller to:

obtain a second request to perform the forward operation on the data flow;

verify an integrity of the data flow utilizing a cyclic redundancy check; and update a status flag based on the cyclic redundancy check, the status flag to indicate a verification of the data flow.

24. The apparatus of claim 22, wherein the first processor core includes an operation controller to:

execute the forward operation on the data flow;

output a transformed data flow based on the forward operation; and generate an integrity check value corresponding to the transformed data flow, the integrity check value to be subsequently used for a cyclic redundancy check at the second processor core.

25. The apparatus of claim 22, wherein the first processor core includes:

an operation controller to output a transformed data flow based on the forward operation; and a response controller to:

determine the identifier of the first processor core, the identifier corresponding to an index of the first processor core in at least one processor; and generate a response descriptor based on concatenating the transformed data flow with the identifier of the first processor core.

\* \* \* \* \*